United States Patent
Muneyoshi et al.

(10) Patent No.: US 8,310,647 B2
(45) Date of Patent: Nov. 13, 2012

(54) IMAGE DISPLAY DEVICE AND MANUFACTURING METHOD OF THE SAME

(75) Inventors: Takahiko Muneyoshi, Higashiyamato (JP); Kiyoshi Ouchi, Kodaira (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 13/345,309

(22) Filed: Jan. 6, 2012

(65) Prior Publication Data

US 2012/0127403 A1 May 24, 2012

Related U.S. Application Data

(62) Division of application No. 11/902,876, filed on Sep. 26, 2007, now abandoned.

(30) Foreign Application Priority Data

Oct. 2, 2006 (JP) .................................. 2006-270884

(51) Int. Cl.
*G02F 1/1333* (2006.01)
*G02F 1/1335* (2006.01)

(52) U.S. Cl. ............ 349/158; 349/33; 349/96; 349/106; 349/123; 349/138

(58) Field of Classification Search .................... 349/33, 349/41, 96, 106, 122, 123, 138, 158
See application file for complete search history.

(56) References Cited

U.S. PATENT DOCUMENTS
2002/0008799 A1   1/2002   Ota et al.

FOREIGN PATENT DOCUMENTS
| JP | 03-056934 | 3/1991 |
| JP | 10-288796 | 10/1998 |
| JP | 2002-184959 | 6/2002 |
| JP | 2005-019054 | 1/2005 |

*Primary Examiner* — Uyen Chau N Le
*Assistant Examiner* — Michael Mooney
(74) *Attorney, Agent, or Firm* — Stites & Harbison, PLLC

(57) ABSTRACT

Disorder in the initial orientation (pretilt angle) and active orientation of liquid crystal molecules associated with higher resolution can be reduced to achieve high image quality displays. A layer having a drive element is bonded into an adhesive layer above color filters provided on the inner surface of a rear panel. The layer with the drive element, a drive electrode (pixel electrode), and a counter electrode are buried in the adhesive layer, so that the surface on the liquid crystal layer side is smooth. An orientation film is formed on the smooth surface to have a liquid crystal orientation control capability (orientation capability). A front panel includes a transparent substrate formed of glass or resin, with a smooth surface on the liquid crystal layer side. An orientation film is formed on the smooth surface of the front panel also to have liquid crystal orientation control capability (orientation capability).

6 Claims, 7 Drawing Sheets

IMAGE DISPLAY DEVICE AND MANUFACTURING METHOD OF THE SAME

CROSS-REFERENCE TO RELATED APPLICATIONS

This application is a Divisional of U.S. application Ser. No. 11/902,876 filed on Sep. 26, 2007. Priority is claimed based on U.S. application Ser. No. 11/902,876 filed on Sep. 26, 2007, which claims the priority from Japanese application JP-2006-270884 filed on Oct. 2, 2006, all of which is incorporated by reference.

BACKGROUND OF THE INVENTION

The present invention relates to an image display device, and is particularly suitable to a high-resolution liquid crystal display device in which disorder of the initial orientation of liquid crystal is reduced to improve image quality, and an image display device using a thin substrate (flexible display), for example, using a plastic substrate. The invention also relates to a method for manufacturing the image display device, and particularly to a method for manufacturing the image display device using a transfer method.

As image display devices of televisions and information terminals, a liquid crystal display device in which liquid crystal material is sealed between a pair of substrates is widely used. A liquid crystal display device of this kind typically includes a plurality of scan signal lines and a plurality of image signal lines, which cross the scan signal lines and are insulated therefrom, on the principal surface (inner surface) of one of the pair of substrates. A pixel is formed in the area surrounded by two adjacent scan signal lines and two adjacent image signal lines. For each pixel, a switching element for controlling on and off, a pixel electrode and the like are formed.

In general, a thin film transistor (TFT element) is used as the switching element. Therefore, one of the substrates on which thin film transistors are provided is typically referred to as a thin film transistor substrate (TFT substrate), and a panel including the TFT substrate (one panel) is also referred to as a rear panel. The other panel, which is paired with the rear panel, includes color filters for a plurality of colors formed on the principal surface of the substrate referred to as a counter substrate in such a way that the color filters correspond to pixels provided on the TFT substrate. The other panel is therefore also referred to as a front panel. The counter substrate is also referred to as a color filter substrate (CF substrate).

Examples of methods for driving a liquid crystal display device are categorized in terms of pixel driving method as a vertical electric field method, such as a TN, method and a VA method, and a horizontal electric field method known as an IPS (In-plane-Switching) method. In the vertical electric field method, the counter electrode (also referred to as a common electrode) that faces the pixel electrode on the TFT substrate that forms the rear panel is provided on the counter substrate that forms the front panel. In the horizontal electric field method (hereinafter referred to as an IPS method), the counter electrode is provided on the TFT substrate on which the pixel electrode is formed.

On the interface between the TFT substrate, which forms the rear panel, and the liquid crystal material, and the interface between the counter substrate, which forms the front panel, and the liquid crystal material, there are provided orientation films having a function (liquid crystal orientation control function) of controlling the direction of the liquid crystal molecules when there is no potential difference between the pixel electrode and the counter electrode (initial orientation) as well as controlling the arrangement and inclination of the liquid crystal molecules when there is a potential difference between the pixel electrode and the counter electrode.

In particular, an IPS liquid crystal display device is known to have a wide viewing angle because the motion of the liquid crystal molecules is rotation in a plane parallel to the substrate surface, so that the optical characteristics do not greatly change with the viewing angle. However, to achieve a large viewing angle, the initial orientation (pretilt) of the liquid crystal molecules needs to be as parallel to the in-plane direction as possible. The orientation film is provided on the TFT elements, wiring lines and the like on the TFT substrate that forms the rear panel, and the orientation film is provided on the black matrix and the color filters on the CF substrate that forms the front panel. By forming the orientation films as flat as possible, the pretilt angle is reduced.

Figure 8:
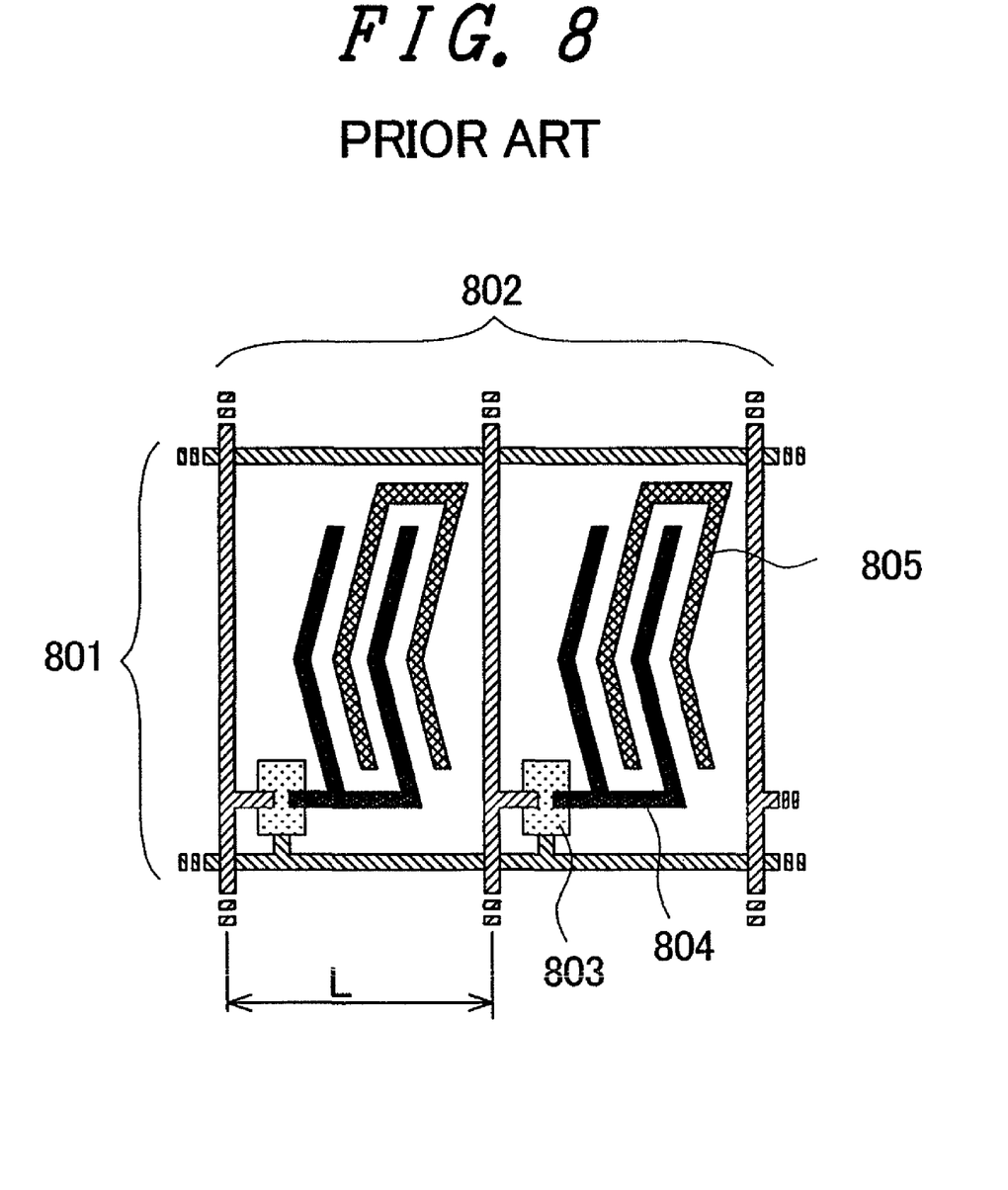
FIG. 8 is a plan view showing an example of arrangement of wiring lines, electrodes, and drive elements for pixels in a conventional IPS liquid crystal display device.

FIG. 8 is a plan view showing an example of arrangement of wiring lines, electrodes, and drive elements for pixels in a conventional IPS liquid crystal display device. FIG. 8 shows only two pixels adjacent in the direction in which gate lines extend. As shown in FIG. 8, gate lines 801 and data lines 802 are periodically disposed on a TFT substrate (not shown) and connected to drive elements (TFT elements) 803. The drive element 803 applies a voltage according to an image signal from the data line 802 to a drive electrode (pixel electrode) 804, so that an electric field induced between the pixel electrode 804 and a counter electrode 805 causes in-plane rotation of the liquid crystal molecules and hence off-to-on transition of the image (pixel). In FIG. 8, let L be the pixel size in the direction in which the data lines 802 are disposed.

Figure 9A:
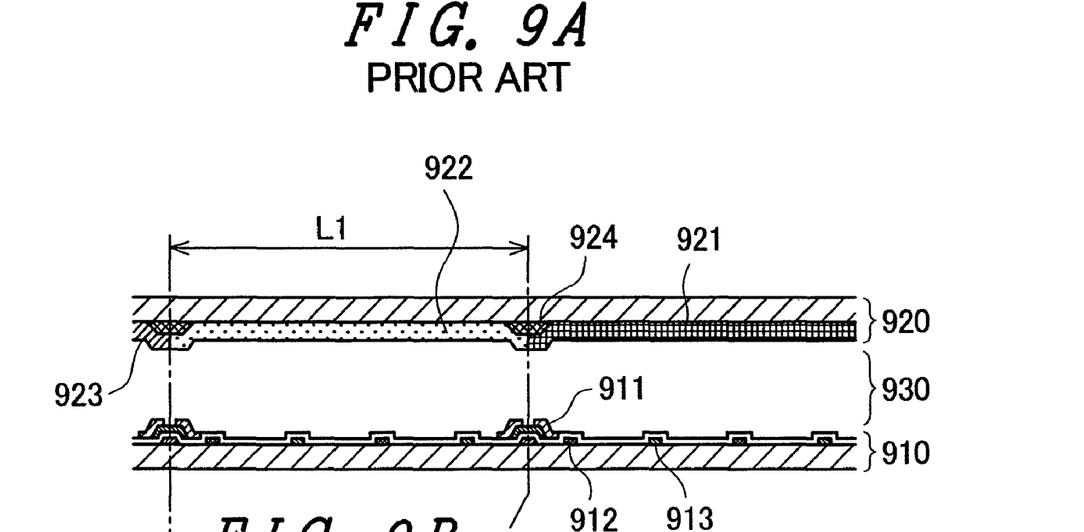
FIGS. 9A and 9B are schematic cross-sectional views taken along the direction in which data lines for the conventional IPS pixels described with reference to FIG. 8 are disposed.
Figure 9B:
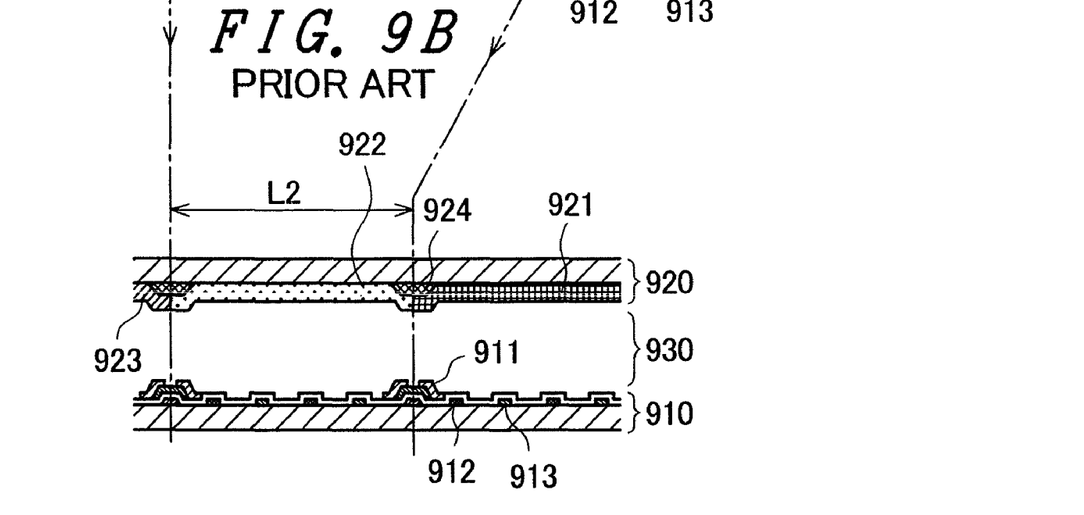

FIGS. 9A and 9B are schematic cross-sectional views taken along the direction in which the data lines for the conventional IPS pixels described with reference to FIG. 8 are disposed. Drive elements 911, drive electrodes 912 and counter electrodes 913 are disposed on a rear panel 910, which is one panel, and color filters 921, 922 and 923, for example, having three separate colors (red: R, green: G, and blue: B) and a light blocking layer (black matrix) 924 between each adjacent pair of the color filters are disposed on a front panel 920, which is the other panel. A liquid crystal layer 930 is sandwiched between the rear panel 910 and the front panel 920.

FIG. 9A shows an exemplary case where the pixel size is L1, and FIG. 9B shows an exemplary case where the pixel size is reduced to L2 for higher resolution. In the rear panel 910, the sizes of the drive element 911, the drive electrode 912, and the counter electrode 913 cannot be easily reduced because of resolution constraint of photolithography used in the manufacturing process. Furthermore, reduction in film thickness of various functional films formed on the substrate surface is limited from the viewpoint of stable operation of the drive element and the like. Thus, the surface roughness of the interface between the rear panel 910 and the liquid crystal layer 930 increases with the size reduction from L1 to L2.

Similarly, reduction in thickness of the light blocking layer 924 and the color filters 921, 922 and 923 on the front panel 920 is limited from the viewpoint of optical characteristics. Thus, the surface roughness increases in the vicinity where the light blocking layer 924 is in contact with the color filters 921, 922 and 923.

Since the IPS method uses liquid crystal molecule rotation in the plane parallel to the substrate surface to control on and off of the pixels, it is important that the liquid crystal molecules are oriented parallel to the substrate surface. The socalled pretilt angle is desirably smaller than or equal to 2 degrees at the maximum, more desirably smaller than or equal to 1 degree if possible. Therefore, the interfaces where the rear panel 910 and the front panel 920 come into contact with the liquid crystal layer 930 are required to be as flat as possible. However, when the pixel size is reduced for higher resolution, the surface roughness of the interface increases from the reason described above. This causes disorder of the orientation of the liquid crystal molecules, resulting in contrast reduction and color shift.

JP-A-10-288796 describes a structure in which a color filter layer is provided on a rear substrate (TFT substrate) side and a drive element (TFT element) is formed on the color filter layer. In this structure, an insulating film for planarization is provided on the color filter layer including color filters and a black matrix formed on the TFT substrate. However, JP-A-10-288796 relates to a solution to display unevenness due to impurity ions from the color filter layer, but does not aim to reduce disorder of the initial orientation, which the invention is to solve. JP-A-2002-184959 relates to a transfer method similar to that used in the invention but does not consider at all the configuration of the TFT element, color filters and the like.

SUMMARY OF THE INVENTION

As described above, as the liquid crystal display device has higher resolution, the footprint of elements and wiring lines in a pixel increases in the rear panel, resulting in increased surface roughness in the pixel. In the front panel, a reduced period of the black matrix similarly increases the surface roughness around the pixel. These factors reduce the orientation regulation capability of the orientation film for preventing reduction in image quality due to partial disorder of the arrangement of liquid crystal molecules. That is, higher resolution reduces the pixel size, but it is difficult to reduce the sizes of the TFT element and the electrodes at the same rate as the pixel size reduction rate because of photolithography constraint. The surface roughness in the pixel therefore increases. Also in the front panel, a reduced pixel size reduces the periods of the color filters and the black matrix, but reduction in film thickness thereof is limited from the viewpoint of optical characteristics. In particular, increased surface roughness around the pixel increases disorder of the initial orientation (pretilt angle) of the liquid crystal molecules and disorder of the active orientation of the liquid crystal molecules, resulting in reduction in image quality.

An object of the invention is to provide an image display device in which disorder of the initial orientation (pretilt angle) of the liquid crystal molecules and disorder of the active orientation of the liquid crystal molecules associated with higher resolution are reduced to achieve high image quality display, an image display device with a thinner substrate, and a manufacturing method of the same.

The image display device according to the invention is a liquid crystal display device in which a rear panel and a front panel sandwich a liquid crystal layer. In the invention, to achieve the above objective, the rear panel includes a transparent substrate; a color filter layer for a plurality of colors formed on the liquid crystal layer side of the transparent substrate; an adhesive layer that buries a layer in which a drive element is configured, the drive element formed above the color filter layer for a plurality of colors, a drive electrode driven by the drive element, and a counter electrode for forming an electric field that controls the orientation of the liquid crystal molecules in the liquid crystal layer in cooperation with the drive electrode; and an orientation film formed on the interface between the rear panel and the liquid crystal layer. The interface between the rear panel and the liquid crystal layer is a uniform flat surface across a plurality of pixels formed in correspondence to the color filters for a plurality of colors.

In the invention, a stopper layer can be provided under the orientation film of the rear panel. The stopper layer has a capability of preventing impurities from the layer in which the drive element is configured, the adhesive layer, or the color filters from diffusing into the liquid crystal layer.

In the invention, the drive element can be disposed in the boundary region between the color filters for a plurality of colors adjacent to each other (hereinafter referred to as "adjacent boundary region"), and a light blocking layer can be provided in the adjacent boundary region to block light incident from the transparent substrate side on the drive element. The light blocking layer can be provided between the drive element and the adjacent boundary region of the color filters for a plurality of colors, or between the adjacent boundary region of the color filters for a plurality of colors and the transparent substrate. In the invention, a polarizer plate can be provided on each of the outer sides of the rear panel and the front panel. In the invention, the transparent substrate can be a plastic substrate.

In a method for manufacturing the image display device according to the invention, the step of forming the rear panel at least includes the steps of:

forming a drive element, a drive electrode, and a counter electrode on a stopper layer, the stopper layer provided on an element formation substrate;

forming an integrated drive element formation substrate/transparent substrate by interposing an adhesive layer in the gap between the surface of the drive element formation substrate, fabricated in the drive element formation substrate fabrication step, on which the drive element, the drive electrode, and the counter electrode are formed and the color filter side of a transparent substrate on which color filters for a plurality of colors are formed in advance, burying the drive element, the drive electrode, and the counter electrode in the adhesive layer, and bonding the drive element formation substrate;

removing the element formation substrate from the integrated drive element formation substrate/transparent substrate; and forming an orientation film on the stopper layer exposed by removing the element formation substrate so as to impart a liquid crystal orientation control capability.

The thickness of the stopper layer is preferably 100 nm or smaller in consideration of the effect of the electric field on the liquid crystal layer. The stopper layer has not only an etching stopper function of preventing the etching from reaching the layer in which the drive element is configured, the drive electrode, and the counter electrode and protecting them when the element formation substrate is etched away, but also a function of preventing impurities from the layer in which the drive element is configured, the adhesive layer, or the color filters from diffusing into the liquid crystal layer.

In the manufacturing method of the invention, the stopper layer along with the element formation substrate of the bonded drive element formation substrate/transparent substrate may be removed by a method for removing the element formation substrate in a precise manner (rough removal through wet etching followed by precise removal through dry etching, removal through mechanical polishing, and the like).

In the manufacturing method of the invention, the drive element formation substrate fabrication step may include the step of forming a light blocking layer for blocking light incident from the transparent substrate side on the drive element, the light blocking layer disposed between the drive element and the adjacent boundary region of the color filters for a plurality of colors.

In the manufacturing method of the invention, the transparent substrate on which the color filters for a plurality of colors are formed in advance may be a transparent substrate having a light blocking layer disposed on the transparent substrate side of the adjacent boundary region of the color filters for a plurality of colors for blocking light incident from the transparent substrate side on the drive element. A polarizer plate can be provided on each of the outer sides of the rear panel and the front panel. In the invention, the transparent substrate can be a plastic substrate.

According to the manufacturing method of the invention, the drive element (TFT element), the drive electrode, the counter electrode, the color filters, the light blocking layer (black matrix), and the like are buried in the layer having a planar structure, so that the surface facing the liquid crystal layer (the surface on which the orientation film is formed) becomes a uniformly flat surface across the display area. The opposite panel (front panel) for sealing the liquid crystal layer is formed of only the transparent substrate whose surface facing the liquid crystal layer has an orientation film provided thereon.

The advantages of the invention are as follows:

(1) Since the drive element (the layer in which the drive element is configured), the drive electrode, the counter electrode, the color filters, the light blocking layer, and the like are buried in the planar structure, a reduced pixel size associated with higher resolution will not increase the surface roughness. As a result, disorder of the initial orientation (pretilt angle) of the liquid crystal molecules and disorder of the active orientation of the liquid crystal molecules associated with higher resolution can be reduced to achieve high image quality display.

(2) Since the panel opposite to the rear panel (front panel) is a transparent substrate whose inner surface has only an orientation film formed thereon, the front panel has high flatness independent of the pixel size.

(3) When the etching stopper layer is left, it is possible to prevent diffusion of impurities that diffuse from the color filter layer, the adhesive layer and the like and affect liquid crystal driving. By setting the thickness of the etching stopper layer to approximately 100 nm or smaller, an appropriate drive voltage can be applied to the liquid crystal layer.

(4) Since the drive element is "transferred" onto the color filters, a plastic substrate can be used as the transparent substrate on which the color filters are fabricated. By using a plastic substrate as the transparent substrate, there is provided a thin, light-weight, breakage-resistant image display device that can be bent to some extent (flexible display).

DESCRIPTION OF THE PREFERRED EMBODIMENTS

The best mode for carrying out the invention will be described below in detail based on embodiments with reference to the drawings.

First Embodiment

Figure 1:
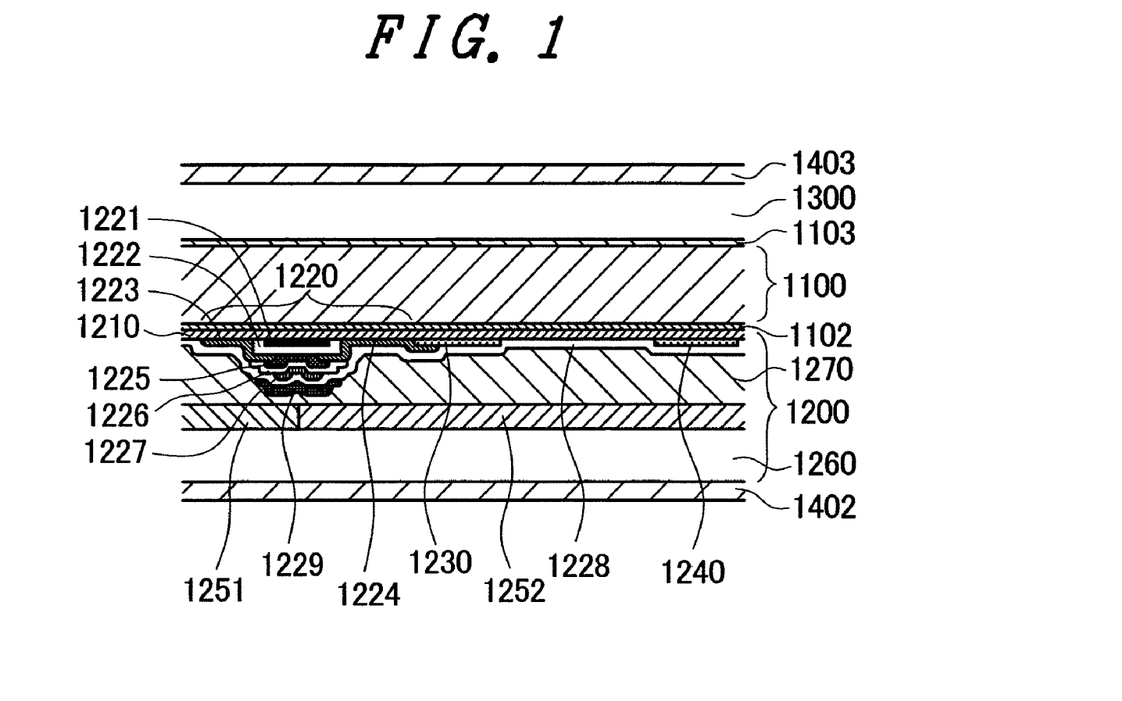
FIG. 1 is a cross-sectional view of one pixel and its vicinity for explaining a first embodiment of the image display device according to the invention.

FIG. 1 is a cross-sectional view of one pixel and its vicinity for explaining a first embodiment of the image display device according to the invention. The image display device of the first embodiment is a liquid crystal display device in which a rear panel (one panel, a drive panel) 1200 and a front panel (the other panel) 1300 sandwich a liquid crystal layer 1100. The rear panel 1200 includes a transparent substrate 1260 formed of a glass plate or a resin sheet, the inner surface of which has color filters 1251 and 1252 for a plurality of colors disposed thereon. A layer in which a drive element (TFT element in this embodiment) 1220 is configured is bonded into an adhesive layer 1270 above the color filters 1251 and 1252. The layer in which the drive element 1220 is configured, a drive electrode (pixel electrode) 1230, a counter electrode 1240 and the like are buried in the adhesive layer 1270, so that the surface on the liquid crystal layer 1100 side is a smooth surface. An orientation film 1102 is formed on the smooth surface, so that a liquid crystal orientation control capability (orientation capability) is imparted to the smooth surface. In the first embodiment, a stopper layer 1210 is provided on the smooth surface and under the orientation film 1102.

The front panel 1300 includes a transparent substrate formed of a glass plate or a resin sheet, the surface of which on the liquid crystal layer 1100 side is a smooth surface. An orientation film 1103 is formed on the smooth surface, so that the liquid crystal orientation control capability (orientation capability) is imparted thereto.

That is, the liquid crystal layer 1100 is sandwiched between the rear panel 1200, having the drive element (TFT element) 1220, and the front panel 1300 via the orientation film 1102 on the rear panel 1200 side and the orientation film 1103 on the front panel 1300 side. Polarizer plates 1402 and 1403 are disposed on the outer sides of the rear panel 1200 and the front panel 1300, respectively. Furthermore, the rear panel 1200 includes the stopper layer 1210, the drive element 1220, the drive electrode (pixel electrode) 1230, the counter electrode 1240, a protective layer 1228, a light blocking layer (black matrix) 1229, the adhesive layer 1270, the color filters 1251, 1252, and the transparent substrate 1260.

The drive element 1220 at least includes a light blocking layer 1221, an insulating layer 1222, a source electrode 1223, a drain electrode 1224, a semiconductor layer 1225, an insulating layer 1226, and a gate electrode 1227. The drain electrode 1224 is electrically connected to the drive electrode 1230, so that when a voltage is applied to the gate electrode 1227 in an appropriate manner, the voltage from the source electrode 1223 is applied to the drive electrode 1230 via the drain electrode 1224. Thus, an electric field is induced between the drive electrode 1230 and the counter electrode 1240, and switches the direction in which the liquid crystal molecules contained in the liquid crystal layer 1100 are orientated.

In the first embodiment, a reduced pixel size associated with higher resolution will not increase the surface roughness. As a result, disorder of the initial orientation (pretilt angle) of the liquid crystal molecules and disorder of the active orientation of the liquid crystal molecules associated with higher resolution can be reduced to achieve high image quality display.

Second Embodiment

Figure 2:
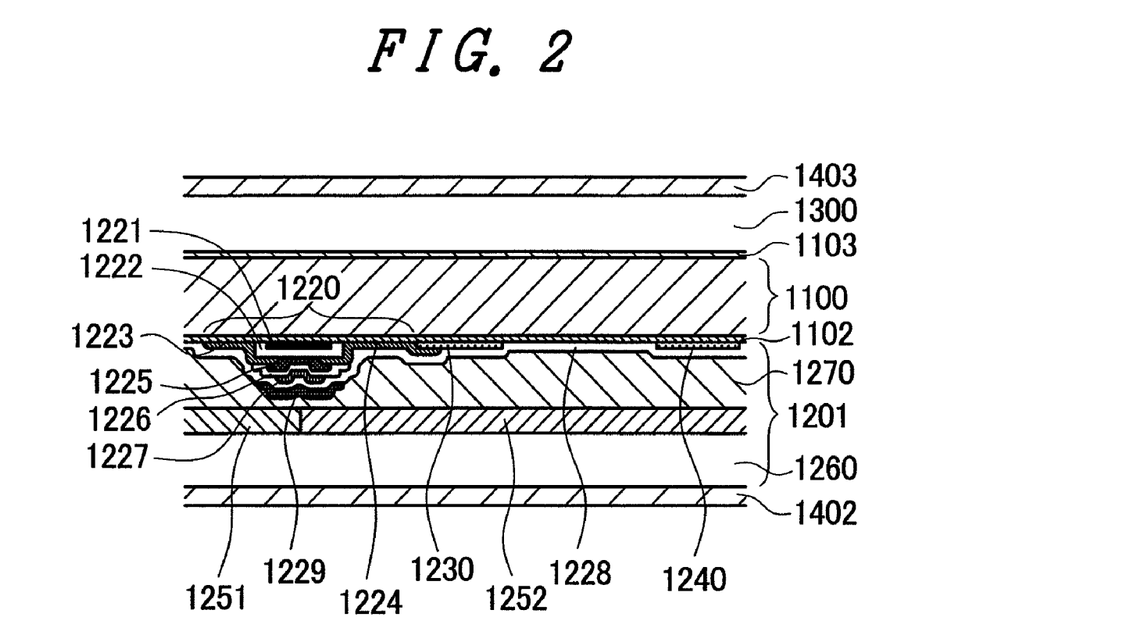
FIG. 2 is a cross-sectional view of one pixel and its vicinity for explaining a second embodiment of the image display device according to the invention.

FIG. 2 is a cross-sectional view of one pixel and its vicinity for explaining a second embodiment of the image display device according to the invention. Portions having the same reference characters as those in FIG. 1 have the same functions. A rear panel 1201 has a configuration similar to that of the rear panel 1200 in FIG. 1 except that the stopper layer 1210 is removed. Since the surface of the rear panel 1201 in contact with the liquid crystal layer 1100 via the orientation film 1102 and the surface of the front panel 1300 in contact with the liquid crystal layer 1100 via the orientation film 1103 are both substantially flat, a reduced pixel size associated with higher resolution will not increase the roughness of the surface of the front panel 1300 as well as the roughness of the surface of the rear panel 1201, both in contact with the liquid crystal layer 1100. It is thus possible to prevent contrast reduction and color shift due to disorder of the orientation of the liquid crystal molecules. Although FIGS. 1 and 2 show only color filters 1251 and 1252 for two colors, full-color display requires at least three colors, R (red), G (green) and B (blue). It is therefore noted that there is at least a color filter for the third color outside the figures.

FIGS. 3A to 3E, FIGS. 4A to 4E, and FIGS. 5A to 5D are process diagrams for explaining an example of a method for fabricating the rear panels in the embodiments of the invention using a transfer method, that is, process diagrams for explaining an example of a method for fabricating the rear panel 1200 described in the first embodiment or the rear panel 1201 described in the second embodiment. This process proceeds in the order of FIG. 3A, FIG. 3B, FIG. 3C, FIG. 3D, FIG. 3E, FIG. 4A, FIG. 4B, FIG. 4C, FIG. 4D, FIG. 4E, FIG. 5A, FIG. 5B, FIG. 5C, and FIG. 5D.

Figure 3A:
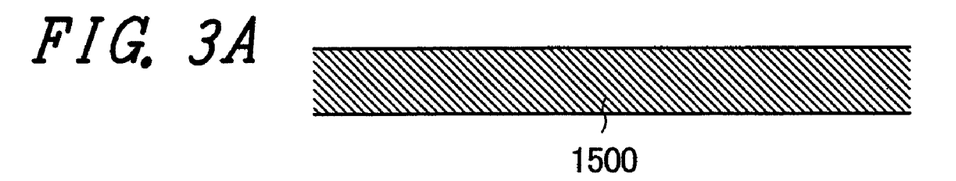
FIGS. 3A to 3E are process diagrams for explaining an example of a method for fabricating the rear panel in an embodiment of the invention.
Figure 3B:
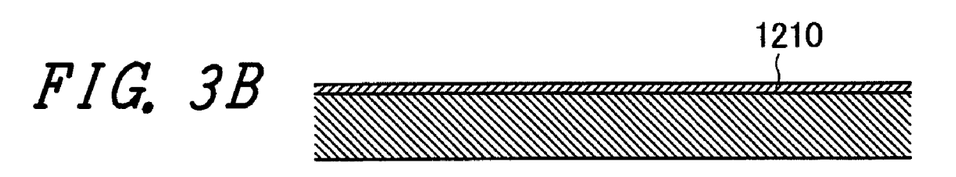

First, the stopper layer 1210, which becomes a layer for stopping etching, is formed on an element formation substrate 1500 through sputtering, CVD, deposition and the like (FIG. 3B). In the rear panel in the second embodiment, the stopper layer is removed. The detail of the stopper layer will be described later.

Figure 3C:
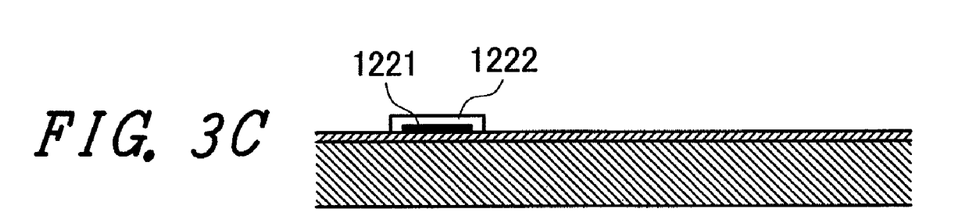

A 0.12 μm-thick Cr film is deposited on the entire surface of the stopper layer 1210 through sputtering, and then the Cr film is patterned at a predetermined position through photolithography to form the light blocking layer 1221 (FIG. 3C).

Next, SiOx is deposited on the entire surface through CVD, and then the SiOx is etched through photolithography to form the insulating layer 1222 on the light blocking layer 1221 (FIG. 3C).

Figure 3D:
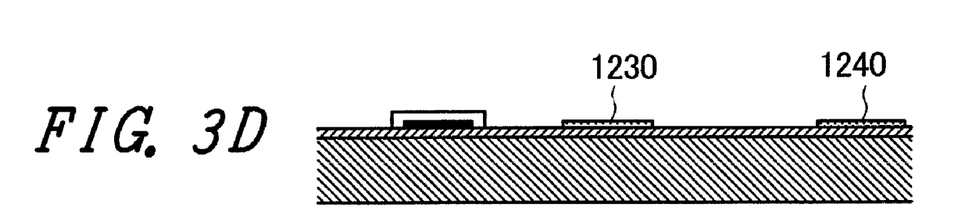

Then, a 0.12 μm-thick ITO film is patterned at a predetermined position through sputtering and photolithography to form the drive electrode 1230 and the counter electrode 1240 (FIG. 3D).

Figure 3E:
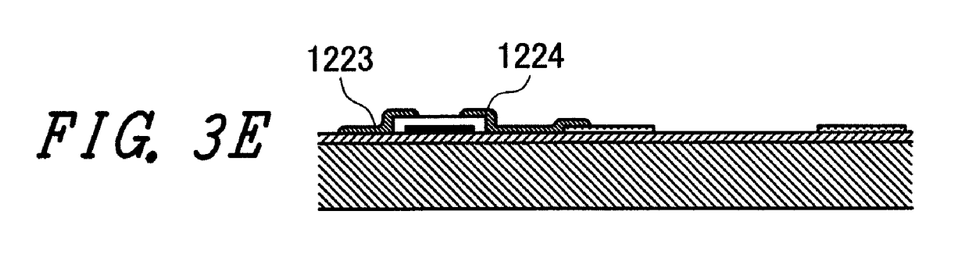

Next, an Al film is patterned at a predetermined position through deposition and photolithography to form the source electrode 1223 and the drain electrode 1224 (FIG. 3E).

Figure 4A:
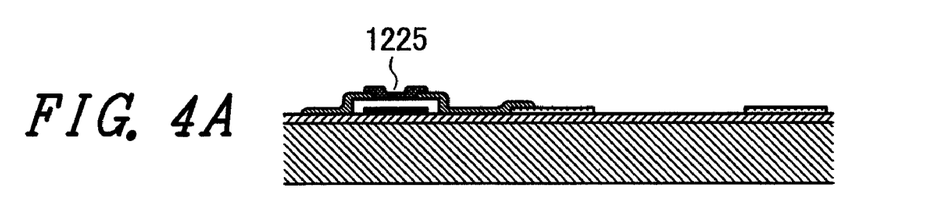
FIGS. 4A to 4E are process diagrams subsequent to FIGS. 3A to 3E, explaining the example of the method for fabricating the rear panel in the embodiment of the invention.

An a-Si film is patterned between the source electrode 1223 and the drain electrode 1224 through CVD and photolithography to form the semiconductor layer 1225 (FIG. 4A).

Figure 4B:
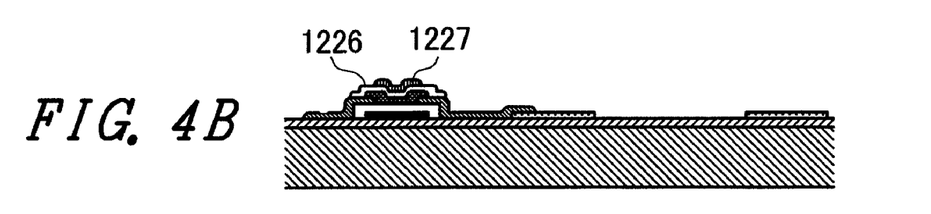
Figure 4C:
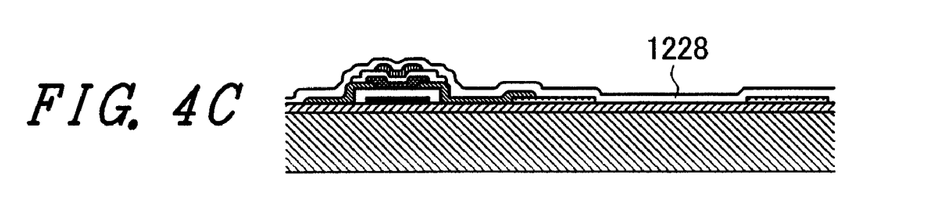

SiOx is deposited on the entire surface through CVD, and then an Al film is deposited on the entire surface through deposition. Then, the SiOx and the Al film are etched through photolithography to form the insulating layer 1226 and the gate electrode 1227 on the semiconductor layer 1225 (FIG. 4B).

Figure 4D:
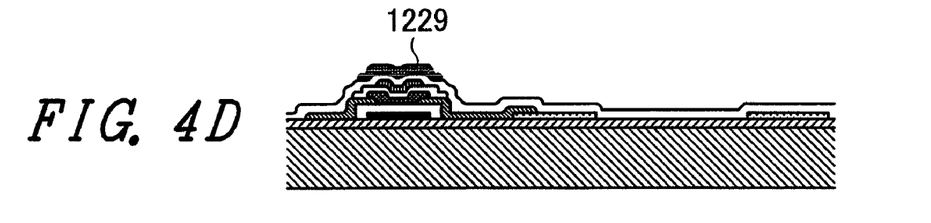

SiOx is deposited on the entire surface through CVD to fabricate the protective layer 1228 (FIG. 4C), and then a 0.12 μm-thick Cr film is deposited on the entire surface through sputtering. Then, the Cr film is patterned at a predetermined position through photolithography to form the light blocking layer 1229 (FIG. 4D).

Figure 4E:
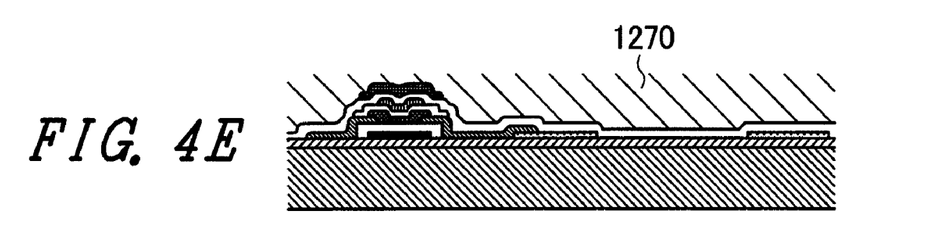
Figure 5A:
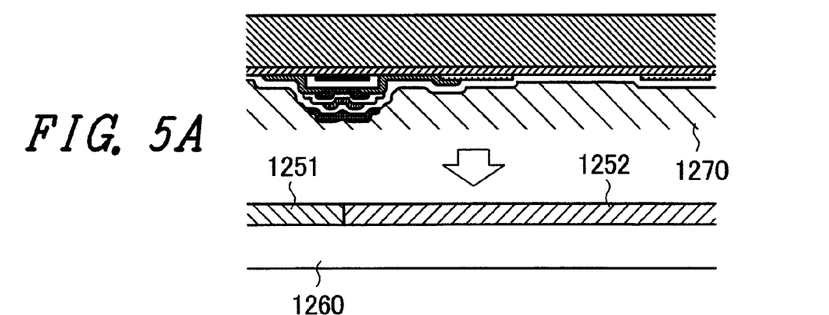
FIGS. 5A to 5D are process diagrams subsequent to FIGS. 4A to 4E, explaining the example of the method for fabricating the rear panel in the embodiment of the invention.
Figures 5B, 5C:
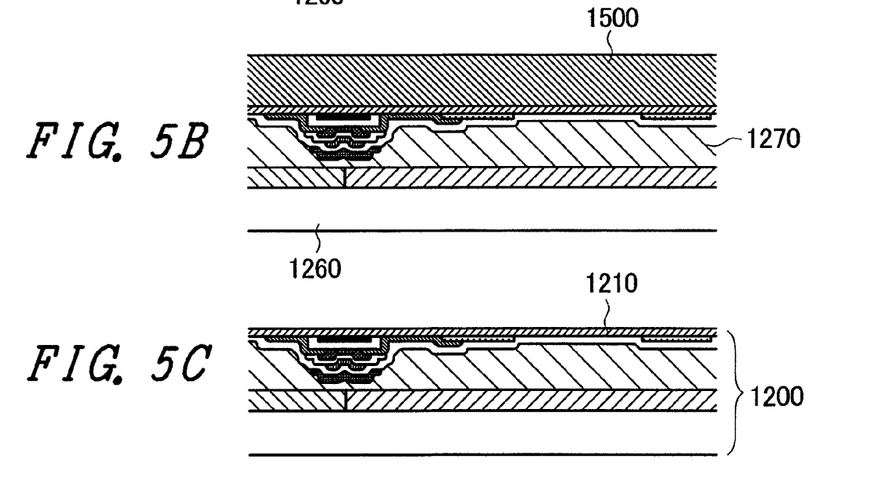

Next, the adhesive layer 1270 is applied on the entire surface (FIG. 4E). The application thickness is thick enough to bury the drive element so as to prevent the drive element from abutting the color filters and hence affecting the flatness of the liquid crystal layer. The resultant structure is positioned and bonded at a predetermined position onto the color filter formation surface of the transparent substrate 1260 on which the color filters 1251 and 1252 are formed in advance (FIG. 5A), followed by hardening of the adhesive layer 1270 (FIG. 5B). Examples of the adhesive layer 1270 may be photo-setting, thermosetting, or mixed reaction adhesives.

Then, the back side of the transparent substrate 1260 is covered with a protective tape or the like (not shown), and then the element formation substrate 1500 is removed through etching (FIG. 5C). The stopper layer 1210 stops the etching. As the etching method, although wet etching is preferred from the viewpoint of the etching rate, after most of the element formation substrate 1500 may be removed through time-controlled wet etching, the remainder may be removed by using a precisely controlled dry process method. Alternatively, after part of the element formation substrate 1500 may be removed through mechanical polishing, the remainder may be removed though wet etching, dry etching, or both. The rear panel 1200 is thus fabricated in the process described above.

Figure 5D:
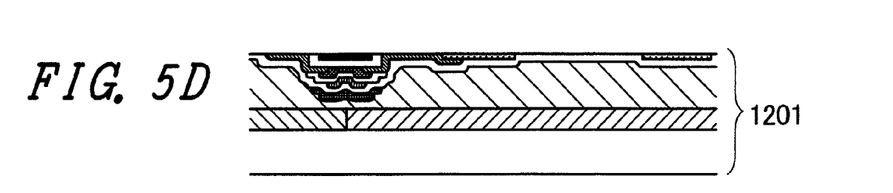

By removing the stopper layer 1210 from the rear panel 1200 through dry etching or the like, the rear panel 1201 described in the second embodiment can be obtained (FIG. 5D). When the stopper layer 1210 is left as in the case of the rear panel 1200 described in the first embodiment, it is desirable to form the stopper layer with a thickness of 100 nm or smaller to effectively apply an electric field to the liquid crystal layer 1100.

The surface of the drive element formation substrate 1500 is designed to have excellent flatness. Since the state of the surface of the drive element formation substrate 1500 is transferred to the surface of the rear panel 1200 or the rear panel 1201 (the surface facing the liquid crystal layer), the flatness thereof becomes significantly excellent. Furthermore, since the front panel 1300 is formed of only the transparent substrate basically having good flatness, the surface of the front panel also has excellent flatness. Therefore, a reduced pixel size will not increase the surface roughness of the interface in contact with the liquid crystal layer, so that it is possible to prevent disorder of the orientation of the liquid crystal molecules associated with higher resolution. There is therefore provided a high resolution IPS liquid crystal display device without contrast reduction and color shift.

Polyimide resin is applied on the rear panel 1200 or the rear panel 1201 and baked, and then a rubbing treatment is carried out to form the orientation film 1102. Column-like spacers (not shown) are formed at predetermined positions on the front panel, and then polyimide resin is applied and baked, as in the rear panel. Then, a rubbing treatment is carried out to form the orientation film 1103. Next, an appropriate amount of liquid crystal material is dripped on the rear panel 1200 or the rear panel 1201, which is bonded to the front panel 1300, followed by a sealing treatment. Then, the polarizer plates 1402 and 1403 are bonded. The image display device (liquid crystal display device) is thus fabricated.

The stopper layer will now be described. When glass (major component of which is $SiO_2$) is used as the material of the drive element formation substrate 1500, wet etchant to be used is a solution containing hydrogen fluoride HF as the base component. Therefore, the stopper layer 1210 needs to be made of an anti-HF material or a material having a smaller etching rate than that of glass. Table 1 shows materials that can be used and cannot be used as the stopper layer as well as their characteristics.

TABLE 1

| (a) Oxides | (b) Fluorides | (c) Others |
|---|---|---|
| $ZrSiO_4$ | $CaF_2$ | $SiNx$ |
| $\alpha\text{-}Al_2O_3$ | $LiF$ | |
| $HfO_2$ | $MgF_2$ | |
| $TiO_2$ | $BaF_2$ | |
| Cubic zirconia | $AlF_3$ | |
| | $HfF_4$ | |
| | $Na_3AlF_6$ | |

When the stopper layer 1210 is left as in the case of the rear panel 1200 of the first embodiment described in FIG. 1, (a) oxides in Table 1, which is difficult to remove, can be used. When the stopper layer 1210 is removed as in the case of the rear panel 1201 of the second embodiment described in FIG. 2, (b) fluorides or (c) SiNx, which is categorized as others, can be used. However, since fluorides generally dissolve in acid, a fluoride alone cannot survive in the etching process where the drive element (TFT element) 1220, the drive electrode (pixel electrode) 1230, and the counter electrode 1240 are formed. Therefore, by first depositing a fluoride, for example, magnesium fluoride ($MgF_2$), on the element formation substrate 1500 and then depositing $SiO_2$ or SiNx on the fluoride, both anti-hydrofluoric acid and anti-etching process (for element formation) properties can be simultaneously achieved. In this case, the stopper layer 1210 has a two-layer structure of $MgF_2+SiO_2$ (or SiNx).

Third Embodiment

Figure 6:
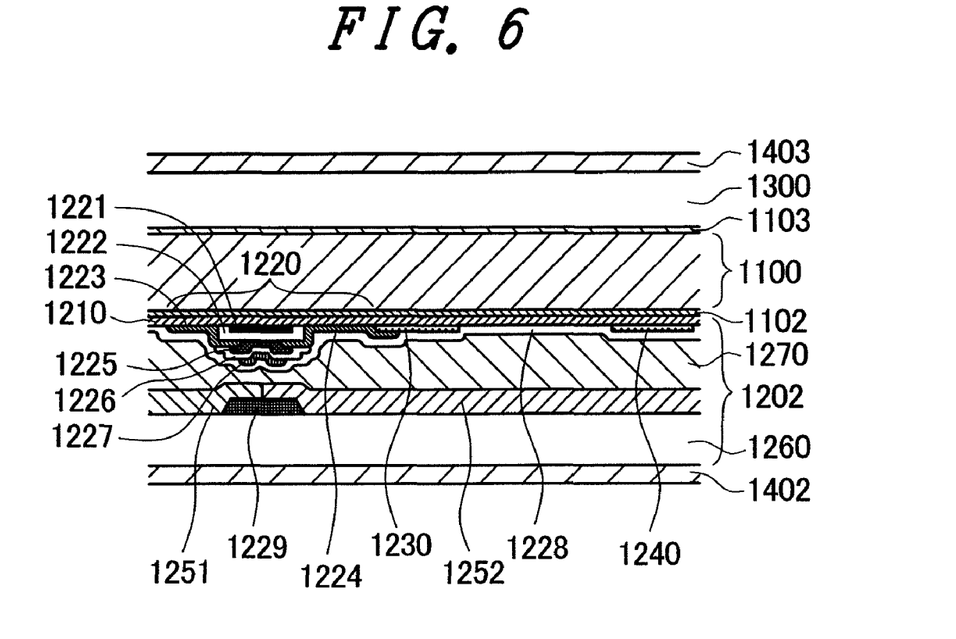
FIG. 6 is a cross-sectional view of one pixel and its vicinity for explaining a third embodiment of the image display device according to the invention.

FIG. 6 is a cross-sectional view of one pixel and its vicinity for explaining a third embodiment of the image display device according to the invention. Portions having the same reference characters as those in FIG. 1 have the same functions. In the third embodiment, as shown in FIG. 6, the light blocking layer 1229 is disposed in the adjacent boundary region of the color filters 1251 and 1252 on the transparent substrate 1260. According to the third embodiment, when the pixel size is reduced, the surface roughness increases in the vicinity where the light blocking layer 1229 is in contact with the color filters 1251 and 1252 (adjacent boundary region), as described in FIGS. 9A and 9B. However, by setting the layer thickness of the adhesive layer 1270 in such a way that the raised portions of the color filters 1251 and 1252 do not abut the drive element 1220 in the adhesive layer, the flatness of the interface to the liquid crystal layer 1100 is not affected.

Fourth Embodiment

Figure 7:
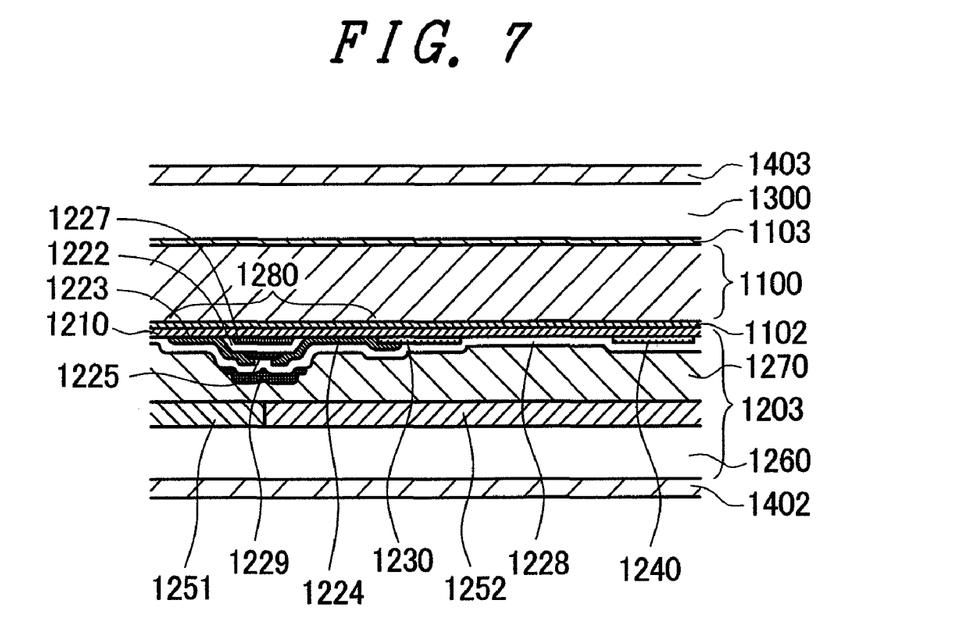
FIG. 7 is a cross-sectional view of one pixel and its vicinity for explaining a fourth embodiment of the image display device according to the invention.

FIG. 7 is a cross-sectional view of one pixel and its vicinity for explaining a fourth embodiment of the image display device according to the invention. Portions having the same reference characters as those in FIG. 1 have the same functions. In the fourth embodiment, a drive element 1280 has a structure in which the vertical relationship between the semiconductor layer 1225 and the gate electrode 1227 of the drive element 1220 in the first to third embodiments is reversed. The liquid crystal layer 1100 can be driven also in such a structure.

In particular, the transparent substrate 1260 and the front panel (counter substrate) 1300 undergo no high-temperature process, so that plastic substrates can be used. In this case, since a plastic substrate is less likely broken than a glass substrate, the thickness of the transparent substrate 1260 and the counter substrate 1300 can be reduced. The thickness of the image display device according to the invention can therefore be smaller than that conventionally achievable. Furthermore, reduced thickness of the whole display device can impart flexibility to the display device.

Although the invention made by the inventor has been specifically described with reference to the above embodiments, the invention is not limited to these embodiments, but various changes can of course be made thereto to the extent that these changes do not depart from the spirit of the invention. In the above embodiments, although the (one transfer) manufacturing method in which the TFT element formed on the element formation substrate is transferred to the transparent substrate has been described, the TFT element formed on the element formation substrate may be transferred to a temporary substrate and then the TFT element may be transferred (second transfer) from the temporary substrate to the transparent substrate.

What is claimed is:

1. The image display device in which a rear panel and a front panel sandwich a liquid crystal layer, the rear panel comprising:
    a transparent substrate;
    a color filter layer for a plurality of colors formed on the liquid crystal layer side of the transparent substrate;
    an adhesive layer that buries a layer in which a drive element is configured, the drive element formed above the color filter layer for a plurality of colors, a drive electrode driven by the drive element, and a counter electrode for forming an electric field that controls the orientation of the liquid crystal molecules in the liquid crystal layer in cooperation with the drive electrode; and
    an orientation film formed on the interface between the rear panel and the liquid crystal layer,
    wherein the interface between the rear panel and the liquid crystal layer is a uniform flat surface across a plurality of pixels formed in correspondence to the color filters for a plurality of colors;
    wherein a stopper layer is provided under the orientation film of the rear panel, the stopper layer having a capability of preventing impurities from the layer in which the drive element is configured, the adhesive layer, or the color filters from diffusing into the liquid crystal layer.

2. The image display device according to claim 1,
wherein a polarizer plate is provided on each of the outer sides of the rear panel and the front panel.

3. The image display device according to claim 1,
wherein the transparent substrate is a plastic substrate.

4. An image display device in which a rear panel and a front panel sandwich a liquid crystal layer, the rear panel comprising:
  a transparent substrate;
  a color filter layer for a plurality of colors formed on the liquid crystal layer side of the transparent substrate;
  an adhesive layer that buries a layer in which a drive element is configured, the drive element formed above the color filter layer for a plurality of colors, a drive electrode driven by the drive element, and a counter electrode for forming an electric field that controls the orientation of the liquid crystal molecules in the liquid crystal layer in cooperation with the drive electrode;
  an orientation film formed on the interface between the rear panel and the liquid crystal layer, and
  a layer is provided under the orientation film of the rear panel, wherein the layer is made of materials selected from the group that includes $ZrSiO_4$, $\alpha\text{-}Al_2O_3$, $HfO_2$, $TiO_2$ and cubic zirconia,
wherein the interface between the rear panel and the liquid crystal layer is a uniform flat surface across a plurality of pixels formed in correspondence to the color filters for a plurality of colors.

5. The image display device according to claim 4,
wherein a polarizer plate is provided on each of the outer sides of the rear panel and the front panel.

6. The image display device according to claim 4,
wherein the transparent substrate is a plastic substrate.

* * * * *